US008777164B2

(12) United States Patent  
Vauchel et al.

(10) Patent No.: US 8,777,164 B2  
(45) Date of Patent: Jul. 15, 2014

(54) AIR INTAKE STRUCTURE FOR AN AIRCRAFT NACELLE

(75) Inventors: Guy Bernard Vauchel, Harfleur (FR); Stephane Beilliard, Toulouse (FR)

(73) Assignee: Aircelle, Gonfreville l'Orcher (FR)

( * ) Notice: Subject to any disclaimer, the term of this patent is extended or adjusted under 35 U.S.C. 154(b) by 450 days.

(21) Appl. No.: 12/918,358

(22) PCT Filed: Jan. 28, 2009

(86) PCT No.: PCT/FR2009/000095  
§ 371 (c)(1), (2), (4) Date: Aug. 19, 2010

(87) PCT Pub. No.: WO2009/112695  
PCT Pub. Date: Sep. 17, 2009

(65) Prior Publication Data  
US 2011/0011981 A1    Jan. 20, 2011

(30) Foreign Application Priority Data

Feb. 27, 2008  (FR) ..................................... 08 01071

(51) Int. Cl.  
*B64D 15/02*    (2006.01)

(52) U.S. Cl.  
USPC ................... 244/134 B; 244/53 B; 244/134 R

(58) Field of Classification Search  
USPC ................................. 244/53 B, 134 R, 134 B  
See application file for complete search history.

(56) References Cited

U.S. PATENT DOCUMENTS

| 2,097,926 A | * | 11/1937 | Kimball ..................... 244/134 C |
| 4,613,102 A | * | 9/1986 | Kageorge .................. 244/134 A |
| 4,674,708 A | * | 6/1987 | del Castillo .................. 244/12.2 |
| 4,674,714 A | * | 6/1987 | Cole et al. ................. 244/134 B |
| 4,688,745 A | * | 8/1987 | Rosenthal ................. 244/134 R |
| 5,088,277 A | * | 2/1992 | Schulze ..................... 60/39.093 |
| 5,393,014 A | * | 2/1995 | Weisend et al. ........... 244/134 A |
| 5,845,878 A | * | 12/1998 | Rauckhorst et al. ...... 244/134 A |
| 5,873,544 A | * | 2/1999 | Pike et al. ..................... 244/1 A |
| RE36,215 E | * | 6/1999 | Rosenthal ................. 244/134 B |

(Continued)

FOREIGN PATENT DOCUMENTS

EP    0918150 A1    5/1999  
FR    2921901 A1    4/2009

OTHER PUBLICATIONS

United States Statutory Invention Registration; USH648; Published Jul. 4, 1989.

(Continued)

*Primary Examiner* — Isam Alsomiri  
*Assistant Examiner* — Assres H Woldemaryam  
(74) *Attorney, Agent, or Firm* — Brinks Gilson & Lione

(57) ABSTRACT

An air inlet structure which is mounted upstream of a central structure of a nacelle of an aircraft engine includes an outer partition incorporating a lip, an upstream partition defining with the outer partition a deicing compartment in the lip, and a hot air supply device to supply the deicing compartment with hot air. The hot air supply device has a hot air supply tube and a peripheral seal plate surrounding the supply tube. In particular, the hot air supply tube has an elbowed free end, and an orifice of the upstream partition allows passage of the elbowed free end according to a main axis of the supply tube. The seal plate includes a contact plate surrounding the supply tube to ensure sealing at the upstream partition.

8 Claims, 8 Drawing Sheets

(56) References Cited

U.S. PATENT DOCUMENTS

| | | | | |
|---|---|---|---|---|
| 6,079,670 A * | 6/2000 | Porte | ................ | 244/134 B |
| 6,193,192 B1 * | 2/2001 | Porte | ................ | 244/134 B |
| 6,267,328 B1 * | 7/2001 | Vest | ................ | 244/134 B |
| 6,354,538 B1 * | 3/2002 | Chilukuri | ................ | 244/134 B |
| 6,427,434 B2 * | 8/2002 | Porte et al. | ................ | 60/39.093 |
| 6,443,395 B1 * | 9/2002 | Porte et al. | ................ | 244/134 R |
| 6,520,452 B1 * | 2/2003 | Crist et al. | ................ | 244/134 A |
| 6,592,078 B2 * | 7/2003 | Porte et al. | ................ | 244/134 B |
| 7,278,610 B2 * | 10/2007 | Giamati | ................ | 244/134 D |
| 7,900,872 B2 * | 3/2011 | Sternberger | ................ | 244/134 C |
| 8,047,470 B2 * | 11/2011 | Porte | ................ | 244/134 B |
| 8,061,657 B2 * | 11/2011 | Rocklin et al. | ................ | 244/134 B |
| 2002/0027180 A1 * | 3/2002 | Porte et al. | ................ | 244/134 R |
| 2002/0139900 A1 * | 10/2002 | Porte et al. | ................ | 244/134 C |
| 2006/0032983 A1 * | 2/2006 | Brand et al. | ................ | 244/134 R |
| 2008/0019822 A1 * | 1/2008 | Grammel et al. | ................ | 415/115 |
| 2009/0152401 A1 * | 6/2009 | Sternberger | ................ | 244/134 B |

OTHER PUBLICATIONS

International Search Report PCT/FR2009/000095; Dated Jul. 20, 2009.

* cited by examiner

AIR INTAKE STRUCTURE FOR AN AIRCRAFT NACELLE

TECHNICAL FIELD

This invention relates to an air intake structure capable of being mounted upstream of a central structure of a nacelle of an aircraft engine.

BACKGROUND

An airplane is powered by one or more propulsive shipsets each comprising a turbojet engine housed in a tubular nacelle. Each propulsive shipset is attached to an aircraft by an engine strut generally located under a wing or at the fuselage.

A nacelle generally has a structure comprising an air inlet upstream of the engine and a central section capable to surround a turbojet engine fan, a downstream section housing thrust inverter means and capable to surround the combustion chamber of the turbojet engine. The nacelle is generally completed by an exhaust nozzle the output of which is located downstream of the turbojet engine.

The air inlet comprises, on the one hand, an inlet lip capable to allow optimal uptake towards the turbojet engine necessary air for the supply of the fan and internal compressors of the turbojet engine, and on the other hand, a downstream structure, onto which is mounted the lip, intended to properly channel the air towards the fan blades. The shipset is attached upstream of a fan casing belonging to the section upstream of the nacelle.

During flight, according to the temperature and humidity conditions, ice may be formed on the nacelle at the outer surface of the air inlet lip. Presence of ice or frost modifies the aerodynamic properties of the air intake and disrupts the airflow towards the fan.

One solution to deice and defrost the outer surface consists to prevent that ice from forming on this outer surface by taking hot air from the compressor of the turbojet engine and directing it up to the air Inlet lip in order to heat the walls.

In document U.S. Pat. No. 4,688,745, a nacelle 10 is proposed comprising an air intake structure 12 having a deicing compartment 13. The air intake structure 12 is capable of being mounted upstream of a central structure 14.

In order to ensure the deicing of the air inlet structure 12, a hot air supply device in the shape of a supply tube 15 conveys hot air taken from the central structure 14 towards the deicing compartment 13.

The deicing compartment 13 is delimited by:
an outer wall 16 incorporating a lip, capable to be mounted to move with respect to the said central structure 14 between an operating position and a maintenance position;
by the term "operating position" it is intended the configuration of the air intake structure wherein the aircraft is capable to fly and by "maintenance position" it is intended the configuration of the structure wherein maintenance on the air input structure can be achieved; and
an upstream partition 18.

In order to form the elbowed supply tube, a rectilinear tube is first inserted through an orifice in the upstream partition 18, the orifice being of a size equal to the diameter of the said pipe. Then, the free end 19 present in this deicing compartment 13 is elbowed up to an angle equal to 90° with respect to the main axis 20 of the rectilinear tube. The sealing between the supply tube 15 and the upstream partition 18 is provided by a circular shape contact plate 21.

Nevertheless, besides the complexity of implementation of this supply device, the junction area between the upstream partition 18 and the elbowed supply tube 15 does not have a good sealing. As a result, hot air escapes from the deicing compartment 13 thereby damaging some equipment in the area of the central structure 14, sensitive to heat.

In patent application FR07/07049, a hot air supply device is proposed wherein the hot air is circulated by means of a supply tube connected to a manifold (so-called "piccolo"). The manifold is mounted integral on the partition.

Nevertheless, most of the forces due to pressure of the hot air conveyed into the supply tube exercises on the manifold, and hence on the partition, and on the air intake structure, which weaken the latter Moreover, it will be observed that these prior art devices are not adapted at all to a device of the LFC ("Laminar Forward Cowl") type such as described in patent application FR0608599 filed by the plaintiff, whereby are faced sealing problems between air intake moving parts (air intake lip integrated into the air intake outer panel) and air intake fixed parts (hot air supply+various equipment).

BRIEF SUMMARY

One purpose of this invention is therefore to provide an air intake structure comprising an effective deicing device, easy to implement, tight and solid.

To this end, according to a first aspect, the purpose of the invention is an air inlet structure capable to be mounted upstream of a central structure of a nacelle of an aircraft engine, the said air intake structure comprising:
an outer partition incorporating a lip,
an upstream partition defining with the outer partition a deicing compartment in the said lip and comprising an orifice,
a hot air supply device intended to supply the deicing compartment with hot air, the said device comprising a hot air supply tube and a peripheral sealing element surrounding the said supply pipe,
characterised in that the hot air supply tube comprises an elbowed free end, the orifice of the upstream partition being configured to allow passage of the free end according to the main axis of the supply pipe, and in that the sealing element comprises a contact plate surrounding the said tube in such a way as to ensure sealing at the upstream partition.

By "elbowed" here is intended a tube the main axis of which is not collinear with the secondary axis of the free end. The main and secondary axes between them make a nonzero angle, advantageously equal substantially to 90°.

The sealing of the upstream partition allows preventing any leakage of hot air into the central structure and thereby thermally insulating the air intake structure from the other elements of the nacelle.

The structure according to the invention is particularly advantageous where the structure is mounted mobile in translation with respect to the central structure between an operating position and a maintenance position. This configuration is known as LFC ("laminar forward cowl) and in particular is described in the aforementioned patent application FR0608599. In this case, the supply device is mounted fixed to the central structure and it must be able to be removed from the deicing compartment, which is movable in translation with respect to the central structure. However, the structure according to the invention provides an effective sealing every time that the supply device is reinserted into the orifice of the upstream partition for obtaining an operating position.

The air intake structure according to the invention provides advantageously deicing in an efficient manner while ensuring a good sealing at the upstream partition. Thus, substantially all the hot air, which is conveyed by the supply tube, discharges into the deicing compartment without damaging the air intake structure. Indeed, the fact that the supply tube is elbowed, the hot air penetrates into the deicing compartment at a non-collinear angle to the main axis of the supply pipe. In the case where the main axis and the secondary axis are at an angle equal substantially to 90°, the direction of flow of the hot air is substantially perpendicular to the main axis. As a result, the hot air is circulated circumferentially without inducing hot air on the outer wall of the air inlet structure.

In a parallel manner, the structure of the invention allows to limit the pressure on the outer wall and on the lip and thus limiting the distortions of the air intake structure. In other words, the elbowed shape of the supply tube in the deicing compartment allows avoiding a direct impact of air from the engine under pressure against the lip. In fact, the direction of the forces generated by the hot air is, first, according to the main axis of the supply pipe, in a general manner substantially perpendicular to the upstream partition. Then, the hot air penetrates the deicing compartment along the secondary axis non-collinear to the main axis. In other words, the pressure due to the hot air penetrating into the deicing compartment is not directed towards the outer partition of the air inlet structure.

Moreover, in the structure of the invention, the implementation of the supply device is simplified. In fact, the supply tube already elbowed penetrates the deicing compartment across the orifice of the upstream partition configured to allow passage of the elbowed free end along the main axis of the supply pipe. In other words, when mounting the supply device, the operator does not need to bend the free end in the deicing compartment.

According to other characteristics of the invention, the structure of the invention has one or more of the following optional characteristics considered individually or according to all possible combinations:

- the outer partition is mounted movable with respect to the outer central structure between an operating position wherein the sealing between the supply device and the upstream partition is made, and a maintenance position wherein the partition and the supply device are separated by sliding of the air intake structure towards the upstream of the nacelle;
- the orifice is configured to provide passage of the plate and of the free end which allows an easy passage of a supply tube across the upstream partition;
- a concentrically outer tube surrounds at least partially the supply tube which improves the thermal insulation of the supply tube vis-à-vis to other elements present in the nacelle and ensuring a safety function should a rupture of the supply tube occur;
- the supply pipe, the outer concentric tube and the contact plate are formed in a single part thereby avoiding using additional parts, of the joint type, to secure sealing between the various elements;
- the contact plate has a substantially elongated shape along the secondary axis of the free end of the supply pipe, the longest length along the secondary axis of the free end of the tubing being greater than the length of the elbowed free end thereby further improving the sealing;
- the free end of the supply tube is substantially connected to a tubing inside the deicing compartment in order to collect the hot air from the supply tube thereby allowing to collect and to direct the hot air more uniformly in the deicing compartment;
- the tubing has at the end, opposite the supply tube, a partial opening intended for receiving the elbowed free end of the supply tube thereby allowing an overlap of the supply tube and the tubing, thus allowing to collect better hot air
- the tubing has a substantially flared part thereby allowing not to disrupt the air from the supply tube towards the tubing;
- the free end of the supply tube and the tubing each having a plate intended to be opposite each other which provides a good collection of hot air;
- the plate of the tubing is formed of a single part with the partition of the tubing thereby limiting the sealing between the plate of the tubing and the tubing thereof;
- the angle of the two plates with respect to the secondary axis of the elbowed free end is equal substantially to 45° thereby improving the crushing kinematic and reliability of the sealing;
- the said tubing extends on each side of the said elbowed free end, and this tubing has an opening capable to interact with a complementary flange ring carried by the said end;
- the said opening is formed in a boss of the said tubing;
- at least one centering device is arranged between the contact plate and the upstream partition or bearing element mounted on the upstream partition thereby limiting the relative displacements between the mobile and fixed structures of the nacelle;
- the upstream partition or bearing element comprises a well receiving a centering device when the hot air supply device offsets along the secondary axis of the free end of the supply tube thereby allowing advantageously to absorb any displacement or to allow intermediate positions when the supply device is brought to move;
- the sealing element has at least one sealing joint separating the contact plate and the upstream partition or the bearing element mounted on the upstream partition;
- the contact plate and the bearing element have complementary shapes and in that at least two joints provide sealing between the said bearing element and the said plate.

According to another aspect, the purpose of the invention is a nacelle for an aircraft engine, characterised in that it comprises an air intake structure according to the invention.

BRIEF DESCRIPTION OF THE DRAWINGS

The invention will be further understood upon reading the non-exhaustive description that follows, with reference to the hereby, attached Figures.

DETAILED DESCRIPTION

Figure 1:
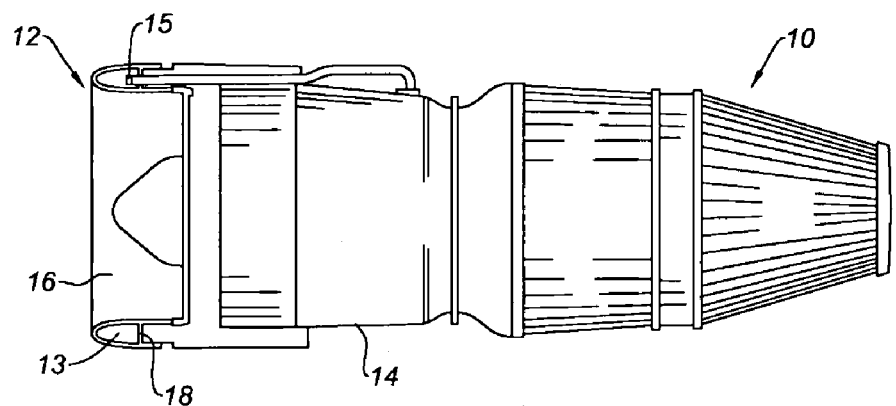
FIG. 1 is a partial side view showing a nacelle having an air intake structure of the prior art.
Figure 2:
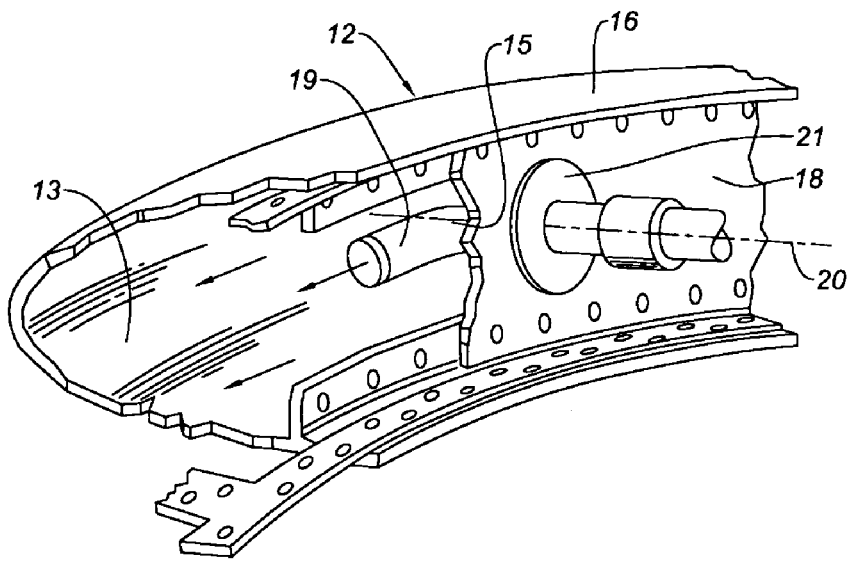
FIG. 2 is a partial perspective view of the air inlet structure according to FIG. 1.
Figure 3:
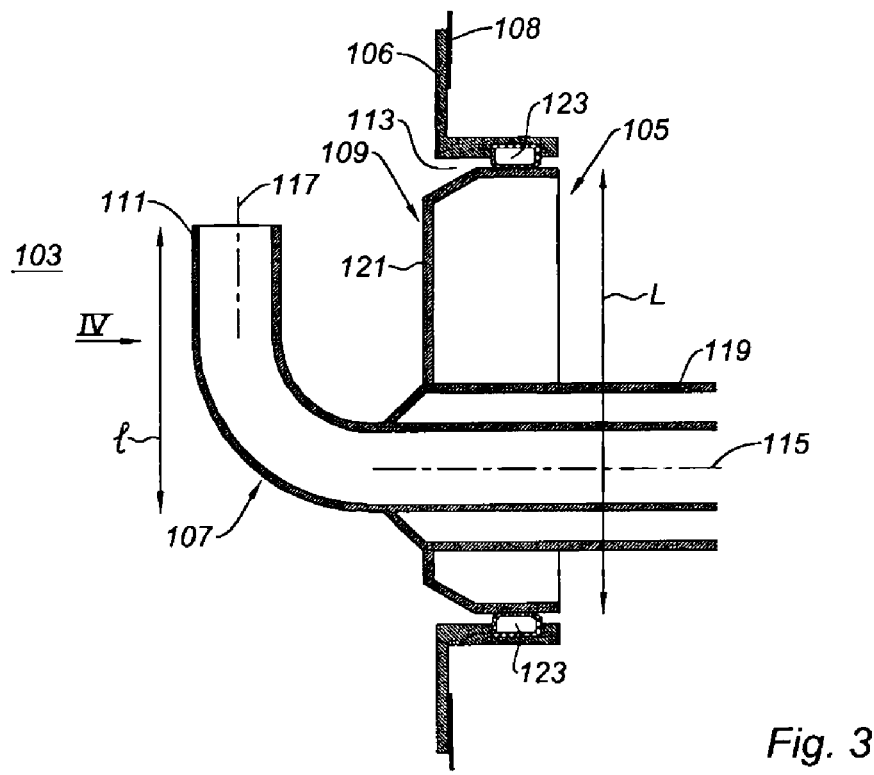
FIG. 3 is a longitudinal cross section of a first embodiment of a supply device of an air intake structure according to the invention.
Figure 4:
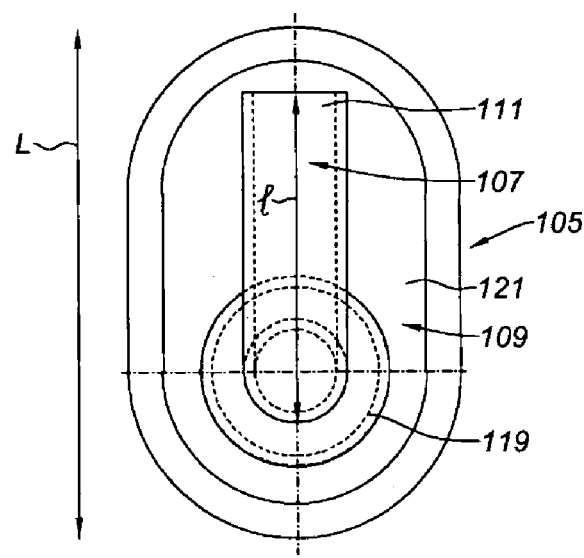
FIG. 4 is a side view of the embodiment of FIG. 3.

According to the embodiment shown in FIGS. 3 and 4, the air intake structure of the invention is intended to be mounted upstream of a central structure of a nacelle of an aircraft engine (not shown).

The air intake structure of the invention comprises an outer wall (not shown) Incorporating an air inlet lip.

The structure according to the invention also comprises an upstream partition 108 defining with the outer wall a deicing compartment 103 in the lip and comprising an orifice 113.

Preferably, the outer wall is mounted mobile with respect to the central outer structure between an operating position wherein the sealing between the supply device 105 and the orifice 113 of the upstream partition is made, and a maintenance position wherein the upstream partition 108 and the supply device 105 are distant by sliding of the air intake structure towards the upstream of the nacelle: in this case it concerns a structure of the "FLC" type such as mentioned above.

Thus, at the time of every maintenance operation, the structure of the invention slides towards the upstream of the nacelle, the supply device 105 remaining fixed to the central structure. When the operator wishes to place again the structure of the invention in an operating position, the latter slides the air inlet structure towards the downstream of the nacelle. The supply device 105 provides again to supply with hot air the deicing compartment 103, the sealing then being carried out at the time when the structure of the invention is placed back in an operating position.

According to one embodiment, a bearing element 106 is mounted on the upstream partition 108 by any means known to the skilled person. The bearing element 106 may have any shape known to the skilled person that ensures the reliability of the sealing at the upstream partition 108.

In addition, the structure according to the invention, has a hot air supply device 105 intended to supply hot air to the deicing compartment 103.

The supply device 105 has a hot air supply tube 107, and a peripheral sealing element 109 surrounds the said supply tube 107.

The hot air supply tube 107 has an elbowed free end 111. The orifice 113 is configured to allow passage of the free end 111 along the main axis 115 of the said tube. The orifice 113 is of such a size that it can allow passage to at least the free end 111, and possibly even part of the sealing element 109.

The main axis 115 of the supply tube forms a nonzero angle with the secondary axis 117. The said angle is advantageously equal substantially to 90°.

The elbowed free end 111 in particular may be divided into several elbowed sub free ends, particularly in various shapes known to the skilled person in the art. The elbowed free end 111 may also be pierced in its cylindrical part.

The supply device 105 undergoes a force of displacement induced by the pressure resulting from the passage of hot air. In order to limit this displacement effort, It Is possible to mount, by any means known to the skilled person in the art, the supply device on a mounted bearing on a fixed structure of the nacelle.

According to a preferred embodiment, a concentric outer tube 119 surrounds at least partially, particularly entirely, the supply tube 107. The presence of the outer tube 119 allows advantageously improving the thermal insulation of the supply tube 107 vis-à-vis with respect to the other elements present in the central structure of the nacelle. In fact, the hot air supply tube 107 crosses through areas of the nacelle that are equipped with equipments, in particular electrical and electronic, that cannot tolerate excessive heat.

Moreover, the outer tube 119 has safety means in case of break of the supply tube 107. In fact, in case of bursting of the supply tube 107, the hot air does not escape into the central structure, but continues to be conveyed towards the deicing compartment 103 by the outer tube 119.

According to one embodiment, one part of the outer tube 119 discharges into the deicing compartment 103 thereby allowing bringing hot air within the deicing compartment 103, without hot air leakage in case of break of the supply tube 107.

Generally, the sealing element 109 has a role of ensuring good sealing with the upstream partition 108 or the bearing element 106 mounted on the upstream partition.

For this reason, the sealing element 109 has a contact plate 121 surrounding the supply tube 107 in such a way as to ensure sealing at the upstream partition 108. Preferably, the orifice 113 is configured to allow passage of the contact plate 121 and the free end 111, thereby allowing easy passage of the supply tube 107 across the upstream partition 108.

Typically, the contact plate 121 has a shape adapted to the output configuration of the supply tube 107. Preferably, the contact plate 121 has a substantially elongated shape along the secondary axis 117 of the free end of the supply pipe. The longest length L of the contact plate 121 along the secondary axis 117 is greater or equal than the length l of the elbowed free end 111. This elongated shape can further improve the sealing since the orifice 113 is of the same size, possibly even smaller than the contact plate 121. Thus, the supply tube 107, possibly even the contact plate 121 crossing the orifice 113, is Introduced Into the deicing compartment 103 without deterioration or modification.

Typically, the contact plate 121 has an oblong shape, possibly even elliptical or rectangular.

According to a preferred embodiment, the supply tube 107, the concentric outer tube 119 and the contact plate 121 are formed in a single piece. Typically, the material used is titanium or inconel. Thus, it is not necessary to introduce additional parts, of the joint type, for ensuring the sealing between the various elements of the supply device 105.

According to a preferential embodiment, the sealing element 109 has at least one piece of sealing, of the joint type 123, separating the contact plate 121 and the upstream partition 108 or the bearing element 106, mounted onto the upstream partition. The sealing parts are in an interesting way tolerant to the sliding of the air intake structure of the invention by ensuring an effective sealing. In this case, the sealing is obtained by crushing of the joint or joints 123. The crushing value of the joint or joints 123, depends on the relative displacements between the mobile and fixed structures of the nacelle during the operation phase, particularly during flight.

The term "sealing parts", used in the context of this invention, designates any sealing system capable of withstanding the high temperatures of hot air flowing through the supply tube 107 (typically in the order of 500° C.) and being tolerant to sliding. This sealing part may be formed in particular by a suitable joint material.

According to one embodiment, a sealing joint 123 is arranged on the entire circumference of the contact plate 121. According to another embodiment, several sealing joints 123 are discretely arranged on the circumference as a whole of the contact plate 121.

Figure 5:
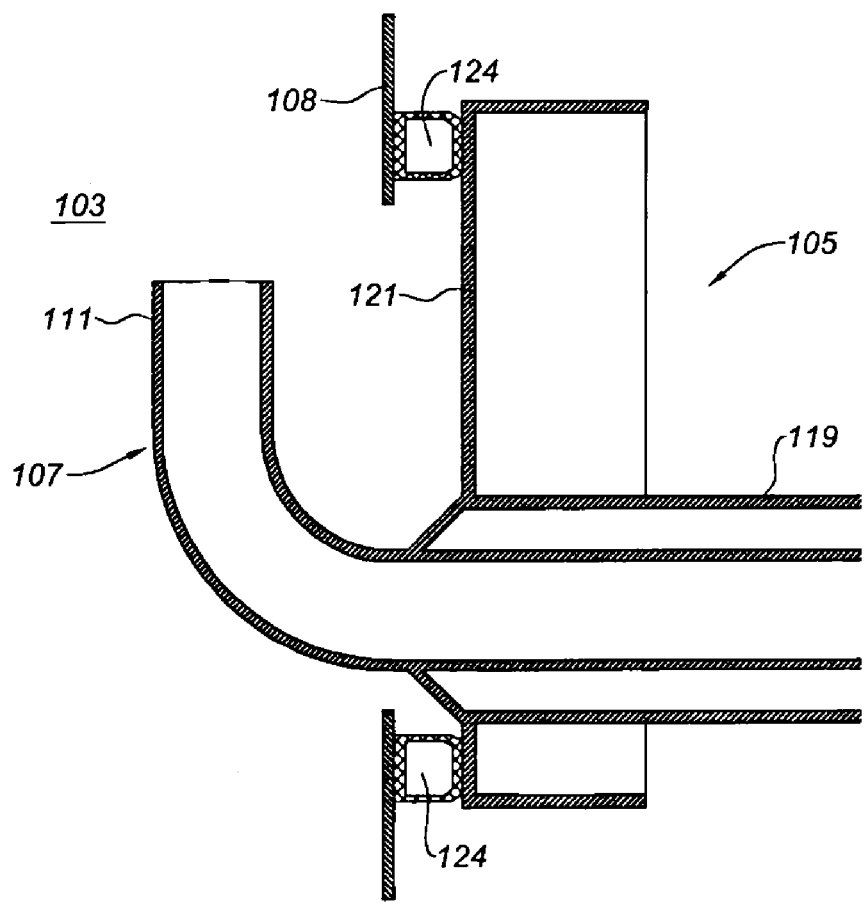
FIG. 5 is a longitudinal cross section of a second embodiment of a supply device of an air intake structure according to the invention.

In the case where the dimensions of the orifice 113 are lower than those of the contact plate 121 as shown in FIG. 5, the contact plate 121 abuts against the upstream partition 108. Typically, one or more sealing joints 124 are mounted between the contact plate 121 and the upstream partition 108. As indicated above, a sealing joint is arranged in a continuous manner between the contact surfaces of the upstream partition 108 and the contact plate 121. According to one embodiment, several sealing joints are discretely arranged between the said contact surfaces.

Figure 6:
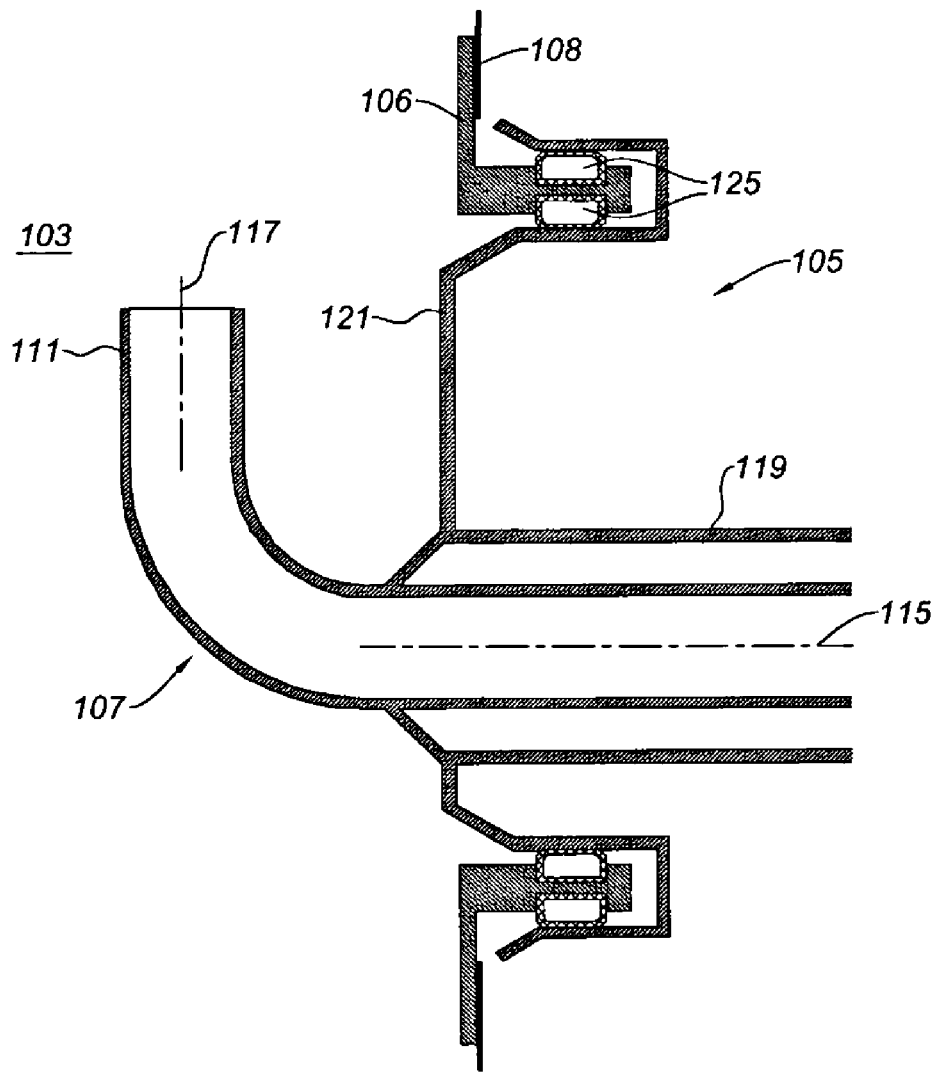
FIG. 6 is a longitudinal cross section of a third embodiment of a supply device of an air intake structure according to the invention.

According to another embodiment shown in FIG. 6, the contact plate 121 and the bearing element 106 have complementary shapes. At least two joints 125 provide sealing between the said bearing element 106 and the said contact plate 121. The joints 125 are arranged either continuously or discretely on the lateral periphery of the contact plate parts 121 of complementary shape of the bearing element 106.

It is also possible to have several sealing lines comprised of joints or any other device known to the skilled person, providing a sealing. The increase in sealing lines allows improving even more the thermal insulation of the central structure.

Figure 7:
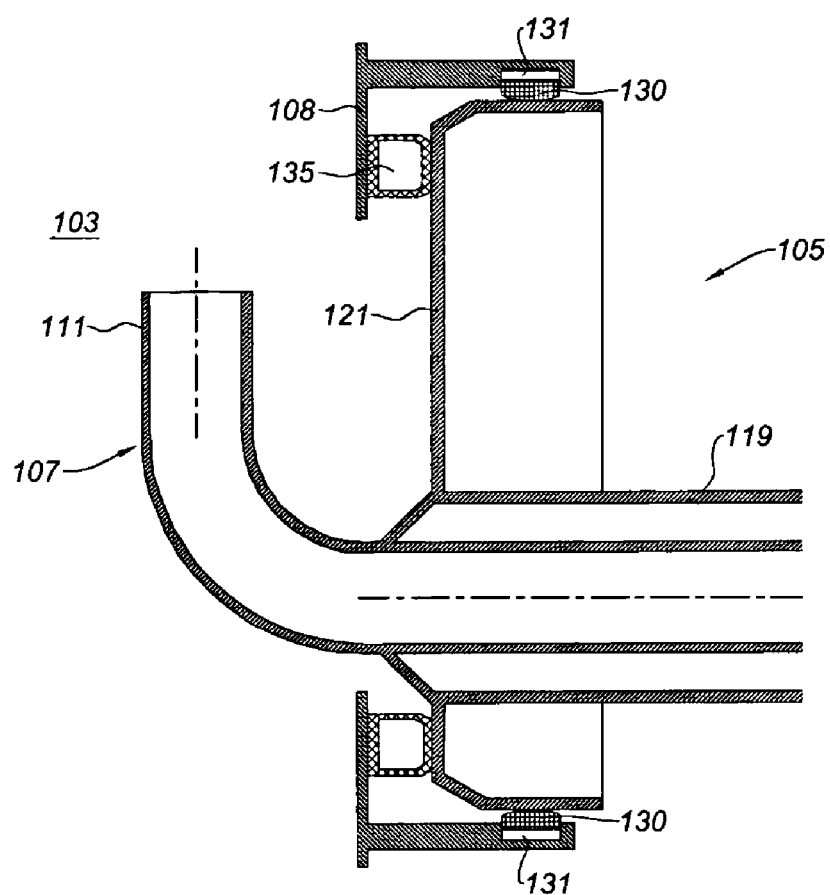
FIG. 7 is a longitudinal cross section of a fourth embodiment of a supply device of an air intake structure according to the invention.

In yet another embodiment shown in FIG. 7, at least one centering device 130 is positioned between the upstream partition 108 or a bearing element mounted on the upstream partition and the contact plate 121. Thus, advantageously, the related displacements between the fixed and mobile structures are limited. Preferably, the upstream partition 108, or the bearing element, has a well 131 receiving a centering device 130 when the hot air supply device 105 is offset along the secondary axis 117 of the free end of the supply tube. Thus, it is possible to absorb any displacement, or to allow intermediate positions, when the supply device 105 is induced to move with respect to its mounting position.

The centering device or devices 130 are arranged for example on the lateral periphery of the contact plate 121, or on a bearing element, mounted on the upstream partition. Similarly, a centering device is arranged continuously between the upstream partition faces 108 and the contact plate 121 which are in contact or, according to another embodiment, several centering devices are discretely arranged.

The centering device 130 can be coupled to a sealing part of the joint type 135 thereby limiting crushing in order to ensure the integrity of the sealing.

The free end 111 of the supply tube is substantially connected to tubing within the deicing compartment 103 in order to collect the hot air from the supply tube 107 thereby allowing to collect and to direct the hot air in a more even wayr in the deicing compartment 103.

Figure 8:
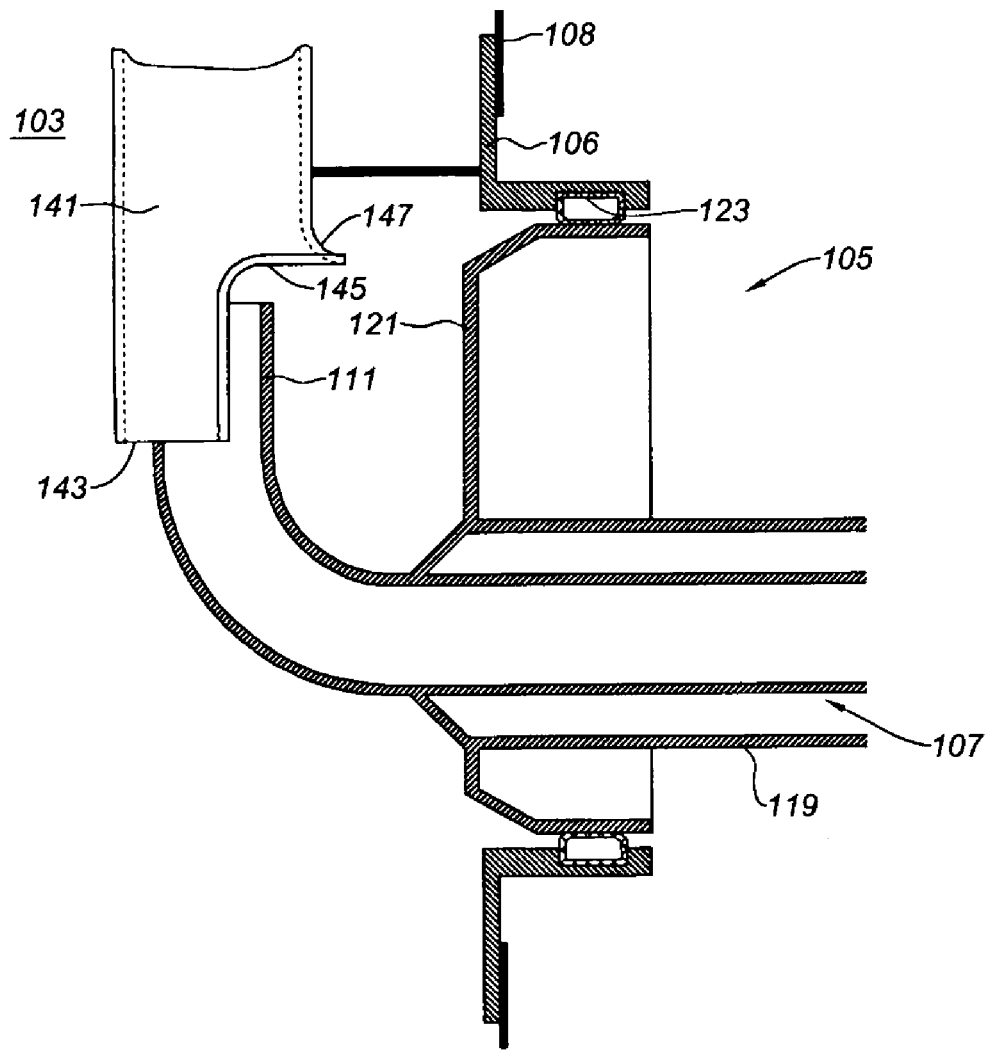
FIG. 8 is a longitudinal cross section of a fifth embodiment of a supply device of an air intake structure according to the invention.

According to the embodiment shown in FIG. 8, the tubing 141 has, in one end 143 opposite of the supply tube 107, a partial opening 145 intended for receiving the elbowed free end 111 of the supply tube thereby allowing an overlap of the supply tube 107 and of the tubing 141 improving the collection of hot air.

The tubing 141 is attached to the upstream partition 108 or on the bearing element 106.

Preferably, the tubing 141 has a substantially flared part 147 thereby allowing not disrupting the air exiting from the supply tube 107 towards the tubing 141.

The presence of the flared part 147 allows having a recirculation of hot air in the deicing compartment 103 and thus ensures good deicing.

Figure 9:
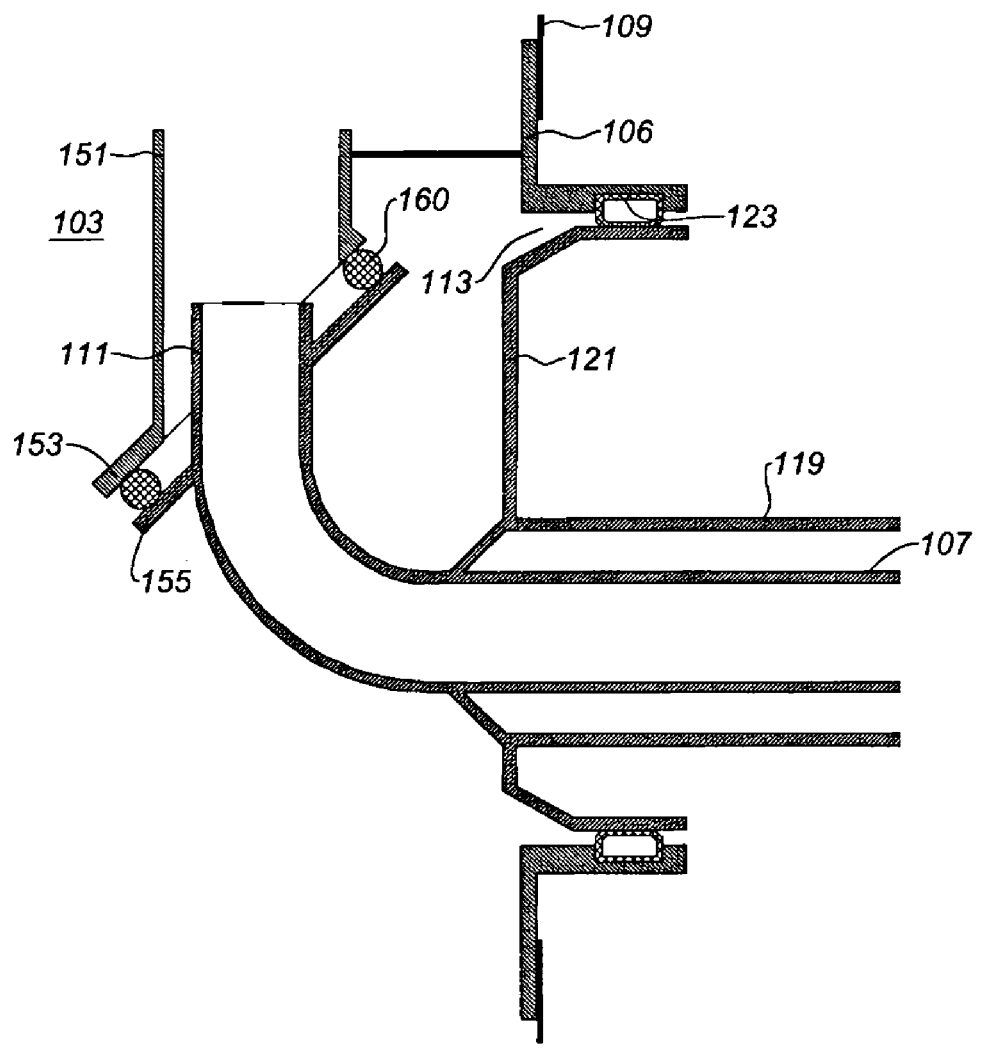
FIG. 9 is a longitudinal cross section of a sixth embodiment of a supply device of an air intake structure according to the invention.

According to another embodiment shown in FIG. 9, the free end 111 of the supply tube and tubing 151 each has a plate 153 and 155 intended to be opposite one another to ensure good sealing between the tubing 151 and the supply tube 107.

Preferably, the plate 153 of the tubing is formed of a single piece with the wall of the tubing 151 thereby removing the sealing problems between the plate 153 of the tubing and the tubing 151 thereof.

According to another preferred embodiment, the angle of the two plates 153 and 155 with respect to the secondary axis 117 of the elbowed free end is equal substantially to 45° allowing improving the kinematic and reliability of crushing of the sealing.

One or the other of the plates 153 and 155 can support a sealing device 160 of the joint type. The angle equal to about 45° allows improving the reliability of crushing of the sealing device 160.

The size of the opening 113 must be sufficient to allow passage of the shipset formed by the tube 107, the plate 121, the plate 155, and the joint 160 without interference with the bearing element 106 or with the joint 123.

It is well understood that this invention is not limited to the embodiments described above.

Figure 10A:
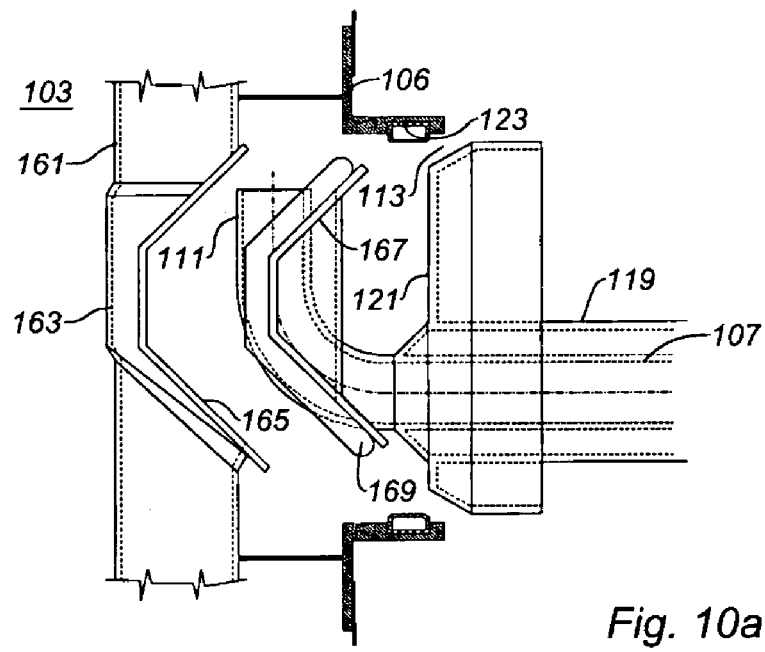
FIGS. 10a and 10b are a longitudinal cross section of a variant of the embodiment of FIG. 9, in positions of maintenance and operation, respectively.
Figure 10B:
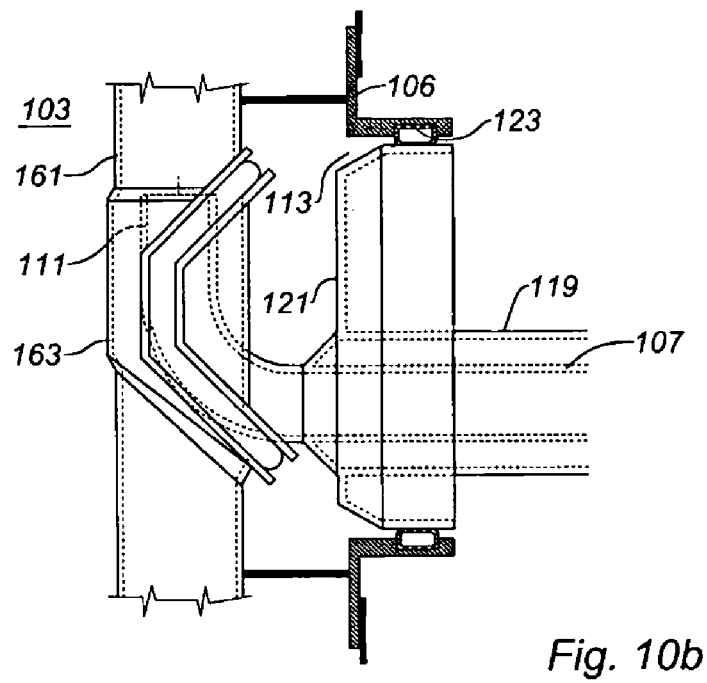

It is thus, for instance, that it might be considered an alternative to the embodiment of FIG. 9, shown in FIGS. 10a and 10b.

In this alternative, the tubing 161, fixedly mounted within the deicing compartment 103, extends on each side of the elbowed free end 111.

This tubing comprises a boss 163 on which is formed an opening 165 capable to interact with a complementary flange ring 167 taken by the elbowed free end 111.

A sealing joint 169 is provided on this opening or on this flange ring.

As shown in FIG. 10b, when the device is in the operating position, the joint 169 is crushed between the opening 165 and the flange ring 167, and the elbowed free end 111 is arranged integrally within the tubing 161.

In this way, hot air leaks out of the tubing 161 are avoided.

Moreover, it will be observed that the boss 163 performed in the tubing 161 allows a regular flow, that is to say without any choke point of the hot air within the tubing 161.

The invention claimed is:

1. An air inlet structure capable to be mounted upstream of a central structure of a nacelle of an aircraft engine, said air intake structure comprising:
   an outer partition incorporating a lip,
   an upstream partition defining with the outer partition a deicing compartment in the lip and comprising an orifice,
   a hot air supply device to supply the deicing compartment with hot air, the device comprising a hot air supply tube and a peripheral sealing element surrounding the supply tube,
   wherein the hot air supply tube extends continuously through the orifice of the upstream partition and defines an elbowed free end, the orifice of the upstream partition being configured to allow passage of the elbowed free end according to a main axis of the supply tube, and wherein the sealing element comprises a contact plate surrounding the tube in such a way as to ensure sealing at the upstream partition.

2. The air inlet structure according to claim 1, wherein an outer wall is mounted movable with respect to an outer central structure between an operating position wherein the sealing between the supply device and the orifice of the upstream partition is made, and a maintenance position wherein the upstream partition and the supply device are separated by sliding of the air intake structure of the upstream of the nacelle.

3. The air inlet structure according to claim 1, wherein the orifice is configured to allow passage of a contact plate and the elbowed free end.

4. The air inlet structure according to claim 3, wherein a concentric outer tube surrounds at least partially the supply tube.

5. The air inlet structure according to claim 4, wherein the supply tube, the concentric outer tube and the contact plate are formed in a single piece.

6. The air inlet structure according to claim 5, wherein the contact plate has a substantially elongated shape along a secondary axis of the free end of the supply tube, a longer length along the secondary axis of the free end of the tubing being greater than a length of the elbowed free end.

7. The air inlet structure according to claim 1, wherein the free end of the supply tube is substantially connected to a tubing within the deicing compartment in order to collect hot air from the supply tube.

8. A nacelle of an aircraft engine comprising an air inlet structure according to claim 1.

* * * * *